(12) United States Patent
LaBou

(10) Patent No.: US 11,853,841 B2
(45) Date of Patent: Dec. 26, 2023

(54) PORTABLE TRACKING DEVICE

(71) Applicant: Michael Lamar LaBou, Fort Lauderdale, FL (US)

(72) Inventor: Michael Lamar LaBou, Fort Lauderdale, FL (US)

( * ) Notice: Subject to any disclaimer, the term of this patent is extended or adjusted under 35 U.S.C. 154(b) by 0 days.

(21) Appl. No.: 17/395,660

(22) Filed: Aug. 6, 2021

(65) Prior Publication Data

US 2023/0038056 A1 Feb. 9, 2023

(51) Int. Cl.
*G06K 7/10* (2006.01)
*G06K 7/14* (2006.01)
*G06F 13/38* (2006.01)
*G06F 1/18* (2006.01)
*G06F 13/42* (2006.01)
*H04N 23/60* (2023.01)

(52) U.S. Cl.
CPC ......... *G06K 7/10881* (2013.01); *G06F 1/181* (2013.01); *G06F 13/382* (2013.01); *G06F 13/4282* (2013.01); *G06K 7/1413* (2013.01); *H04N 23/60* (2023.01); *G06F 2213/0042* (2013.01)

(58) Field of Classification Search
CPC .. G06K 7/10881; G06K 7/1413; G06F 1/181; G06F 13/382; G06F 13/4282; G06F 2213/0042; H04N 5/232
See application file for complete search history.

(56) References Cited

U.S. PATENT DOCUMENTS

| | | | | |
|---|---|---|---|---|
| 8,600,196 B2* | 12/2013 | King | ..................... | G06Q 30/00 382/313 |
| 9,800,293 B2* | 10/2017 | Smith | .................. | H04B 5/0031 |
| 10,007,858 B2* | 6/2018 | Bremer | .................. | G06V 10/17 |
| 10,496,909 B1* | 12/2019 | Holman | ............... | G07D 7/0043 |
| 2016/0136313 A1* | 5/2016 | Nguyen | .................. | H02J 50/10 315/76 |
| 2017/0018094 A1* | 1/2017 | Todeschini | ............. | G01B 11/24 |
| 2018/0241218 A1* | 8/2018 | Spinella | .................. | H02J 50/80 |
| 2020/0235607 A1* | 7/2020 | Kanarellis | .......... | H04B 7/18597 |
| 2021/0264764 A1* | 8/2021 | Glynn | ..................... | G08B 21/14 |
| 2022/0147889 A1* | 5/2022 | Frederick | ........... | G06Q 10/0635 |
| 2022/0151207 A1* | 5/2022 | Mott | .................... | A01K 27/009 |

* cited by examiner

*Primary Examiner* — Thien M Le

(57) ABSTRACT

A portable tracking device including a substantially rectangular base unit. A display screen, a video camera, a keypad, a pair of lights, an activation control, a video control, a bar code scanner, and a camera control are disposed on the base unit. The pair of lights includes a first light and a second light. The bar code scanner is configured to scan the barcode of each of a plurality of tags. The first light of the pair of lights is configured to activate when a user scans the barcode of one of the plurality of tags a first time. The first light of the pair of lights is configured to deactivate and the second light of the pair of lights is configured to simultaneously activate when the user scans the barcode of one of the plurality of tags a second time.

2 Claims, 6 Drawing Sheets

PORTABLE TRACKING DEVICE

BACKGROUND OF THE INVENTION

Figure 1:
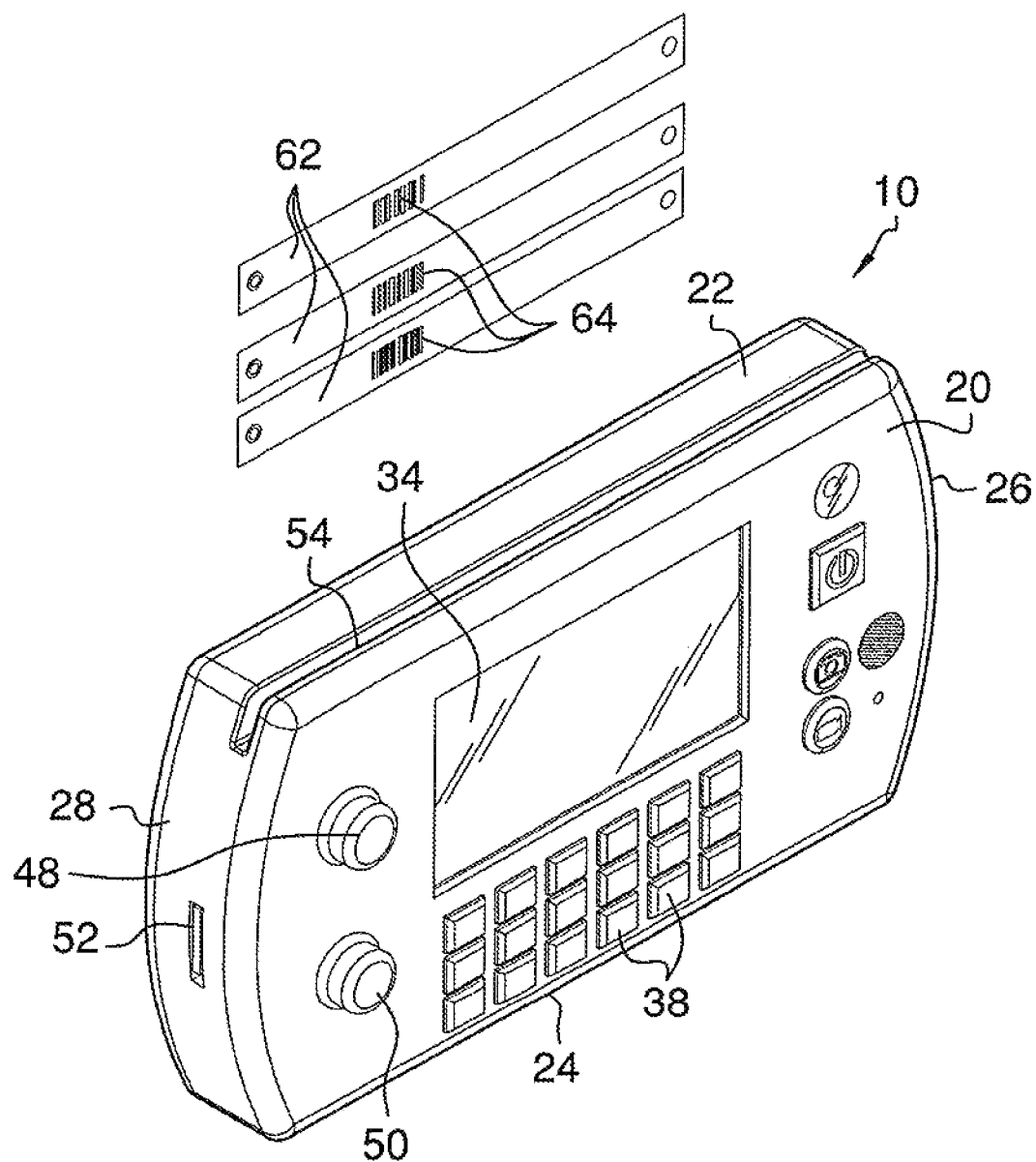

Various types of tracking methods and devices are known in the prior art. However, what has been needed is a portable tracking device including a substantially rectangular base unit. A display screen, a video camera, a keypad, a pair of lights, an activation control, a video control, a bar code scanner, and a camera control are disposed on the base unit. The pair of lights includes a first light and a second light. The bar code scanner is configured to scan the barcode of each of a plurality of tags. The first light of the pair of lights is configured to activate when a user scans the barcode of one of the plurality of tags a first time. The first light of the pair of lights is configured to deactivate and the second light of the pair of lights is configured to simultaneously activate when the user scans the barcode of one of the plurality of tags a second time. The portable tracking device thus helps a user from misplacing important personal items and accidentally leaving behind a child in an automobile, since each of the personal items and the child can be scanned into and out of the particular location of interest.

FIELD OF THE INVENTION

The present invention relates to tracking methods and devices, and more particularly, to a portable tracking device.

SUMMARY OF THE INVENTION

The general purpose of the present portable tracking device, described subsequently in greater detail, is to provide a portable tracking device which has many novel features that result in a portable tracking device which is not anticipated, rendered obvious, suggested, or even implied by prior art, either alone or in combination thereof.

To accomplish this, the present portable tracking device includes a substantially rectangular base unit having a top side, a bottom side, a convexly curved right side, a convexly curved left side, a front side, and a rear side. A display screen, a video camera, a keypad, a pair of lights, an activation control, a video control, and a camera control are disposed on the front side of the base unit. The pair of lights includes a first light and a second light. A color of the first light is red, and a color of the second light is green. A universal serial bus. port is disposed on the base unit. A bar code scanner is disposed on a top side of the base unit. A battery compartment is disposed within the rear side of the base unit, with a battery removably disposed within the battery compartment. A central processing unit is also disposed within the base unit.

The portable tracking device further includes a plurality of tags, with each of the plurality of tags having a barcode. One of the plurality of tags is removably attachable to a nearly limitless number of personal items including, but not limited to, a cellular phone and keys. One of the plurality of tags can also be removably attached to a person, most often a young child. The bar code scanner is configured to scan the barcode of each of the plurality of tags. The first light of the pair of lights is configured to activate when a user scans the barcode of one of the plurality of tags a first time. The first light of the pair of lights is configured to deactivate and the second light of the pair of lights is configured to simultaneously activate when the user scans the barcode of one of the plurality of tags a second time. Thus, the user can initially scan the item when it is first placed in an automobile or building and then later scan the item to indicate that it is has been accounted for and has not been misplaced or forgotten, ultimately helping to prevent the item from becoming lost or a child from being accidentally forgotten in the automobile. Furthermore, the video control is configured to activate a video portion of the video camera and the camera control is configured to activate a still camera portion of the video camera. The display screen, the video camera, the keypad, the pair of lights, the universal serial bus port, the bar code scanner, the battery, the central processing unit, the activation control, the video control, and the camera control are in operational communication with each other.

The portable tracking device optionally includes a rectangular removable inner securing member and a rectangular outer securing member. The inner securing member has a top surface, a bottom surface, a right side surface, a left side surface, a front surface, and a rear surface. Each of an upper clamp and a lower clamp of a pair of flexible clamps is attached to the front surface of the inner securing member proximal the top surface and the bottom surface, respectively. Each of an upper right hook, an upper left hook, a lower right hook, and a lower left hook of a plurality of hooks is attached to each of the right side surface proximal the top surface, the left side surface proximal the top surface, the right side surface proximal the bottom surface, and the left side surface proximal the bottom surface, respectively, of the inner securing member.

The outer securing member has a right top corner, a left top corner, a right lower corner, a left lower corner, a front portion, a rear portion, and an adhesive covering disposed on the rear portion. The adhesive covering of the outer securing member removably attaches to an external stationary object including, but not limited to, an automobile dashboard and an automobile console. Each of an upper right outer strap, an upper left outer strap, a lower right outer strap, and a lower left outer strap of a plurality of straps has a front area and a rear area. Each of the upper right outer strap, the upper left outer strap, the lower right outer strap, and the lower left outer strap is attached to the outer securing member proximal the right top corner, the left top corner, the right lower corner, and the left lower corner, respectively. Each of a right outer pair and a left outer pair of a plurality of a pair of interconnectable outer hook and loop fasteners has an upper outer strip and a lower outer strip. The upper outer strip of each of the right outer pair and the left outer pair is disposed on the front area of each of the upper right outer strap and the upper left outer strap, respectively, and the lower outer strip of each of the right outer pair of hook and loop fasteners and the left outer pair of hook and loop fasteners is disposed on the rear area of each of the lower right outer strap and the lower left outer strap, respectively. Each of the right outer pair of hook and loop fasteners and the left outer pair of hook and loop fasteners is configured to secure the upper right outer strap to the lower right outer strap and the upper left outer strap to the lower left outer strap, respectively.

Each of a first square and a second square of a pair of interconnectable hook and loop fastener squares is disposed on the rear surface of the inner securing member and the front portion of the outer securing member, respectively. The pair of hook and loop fastener squares is configured to removably secure the inner securing member to the outer securing member. Each of a pair of inner straps has an outer surface, an inner surface, a right end, a left end, and a fastening mechanism. One of the pair of inner straps is removably disposable through a pair of the plurality of hooks. The fastening mechanism is configured to secure the right end of one of the pair of inner straps to the left end of one of the pair of inner straps when one of the pair of inner straps is disposed through the pair of the plurality of hooks. The pair of clamps is configured to removably attach the base unit to the inner securing member. Each of the base unit, the inner securing member, and the outer securing member is optionally plastic for strength and durability.

The inner securing member and the outer securing member thus provides the user with a plurality of ways in which to secure the base unit to an external stationary object including, but not limited to, a car seat, a car dashboard, and a car console. Furthermore, the detachability of the inner securing member from the outer securing member and the pair of inner straps removably disposable through the pair of the plurality of hooks allows the user to separately transport and secure the inner securing member and the base unit to the external stationary object apart from the outer securing member. The selective removability of the base unit from the inner securing member allows the user to carry the base unit with him when it is not in use, thus preventing a potential theft of the base unit. Thus has been broadly outlined the more important features of the present portable tracking device so that the detailed description thereof that follows may be better understood and in order that the present contribution to the art may be better appreciated.

BRIEF DESCRIPTION OF THE DRAWINGS FIGURES

Figure 2:
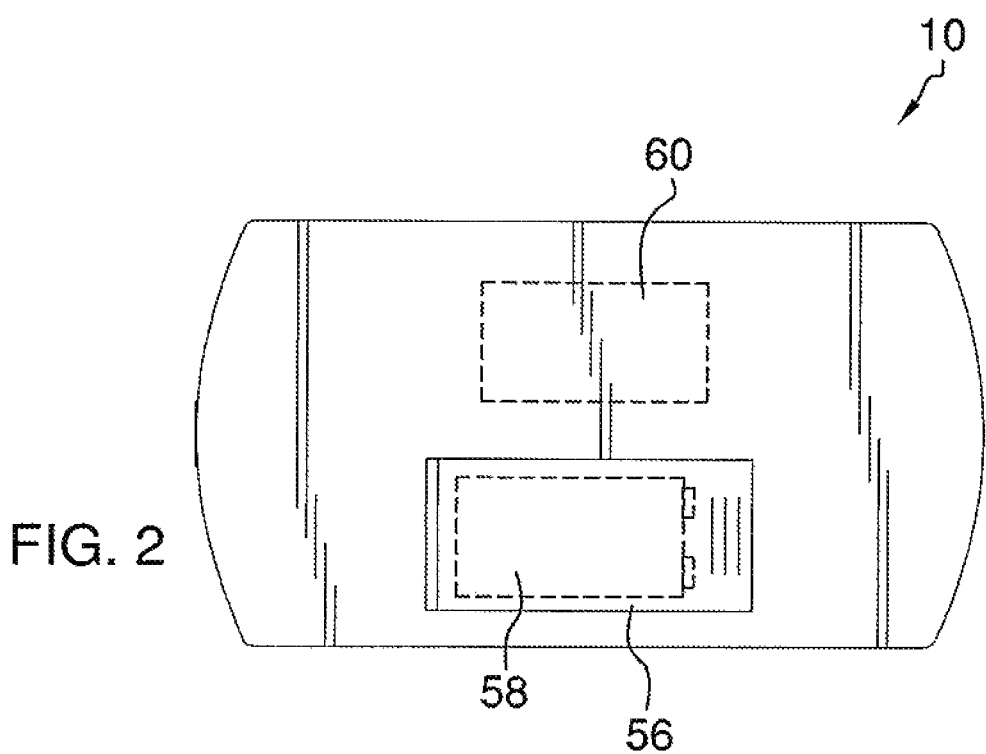
Figure 3:
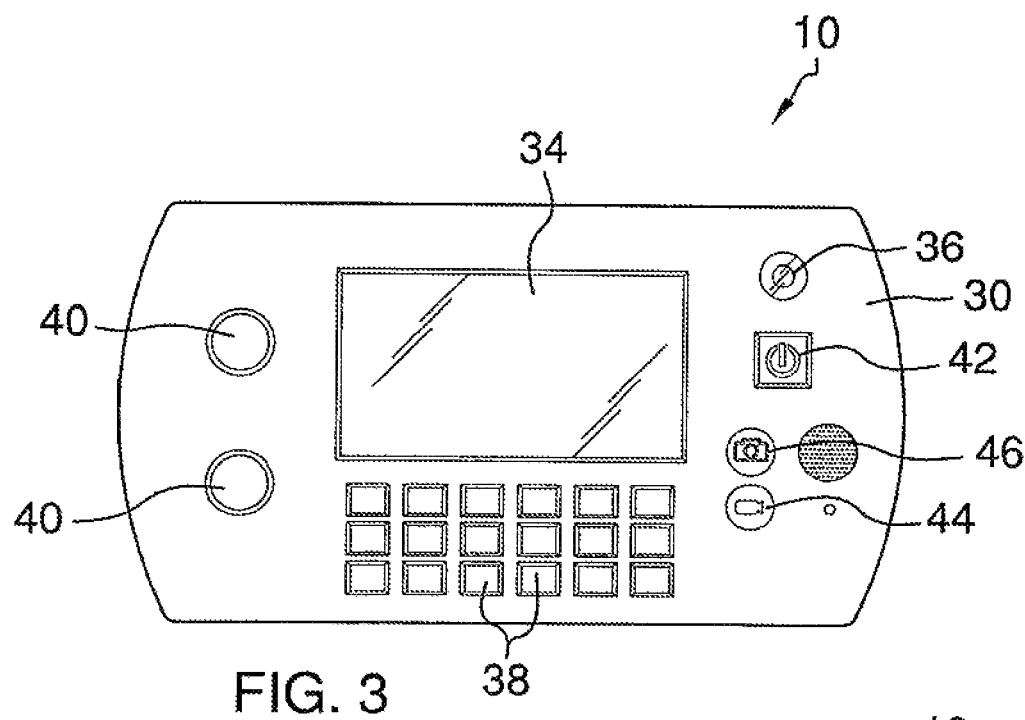
Figure 4:
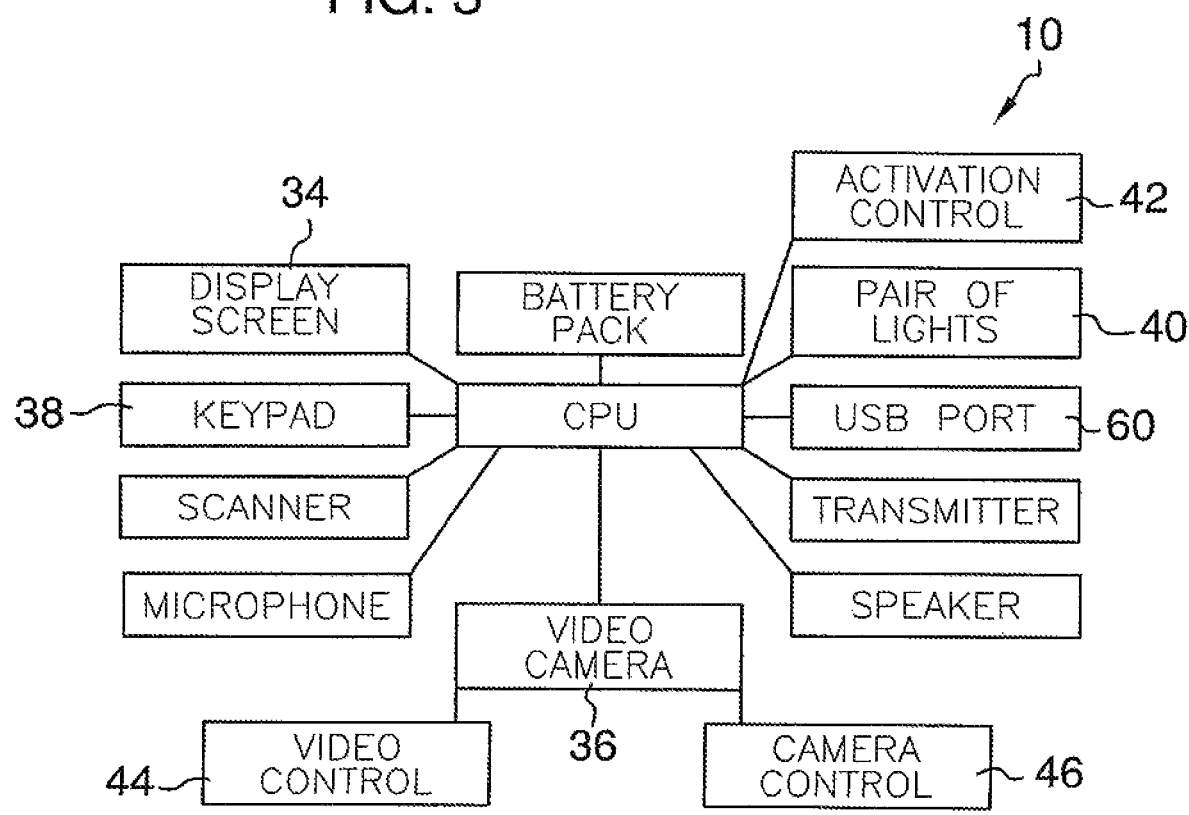
Figure 5:
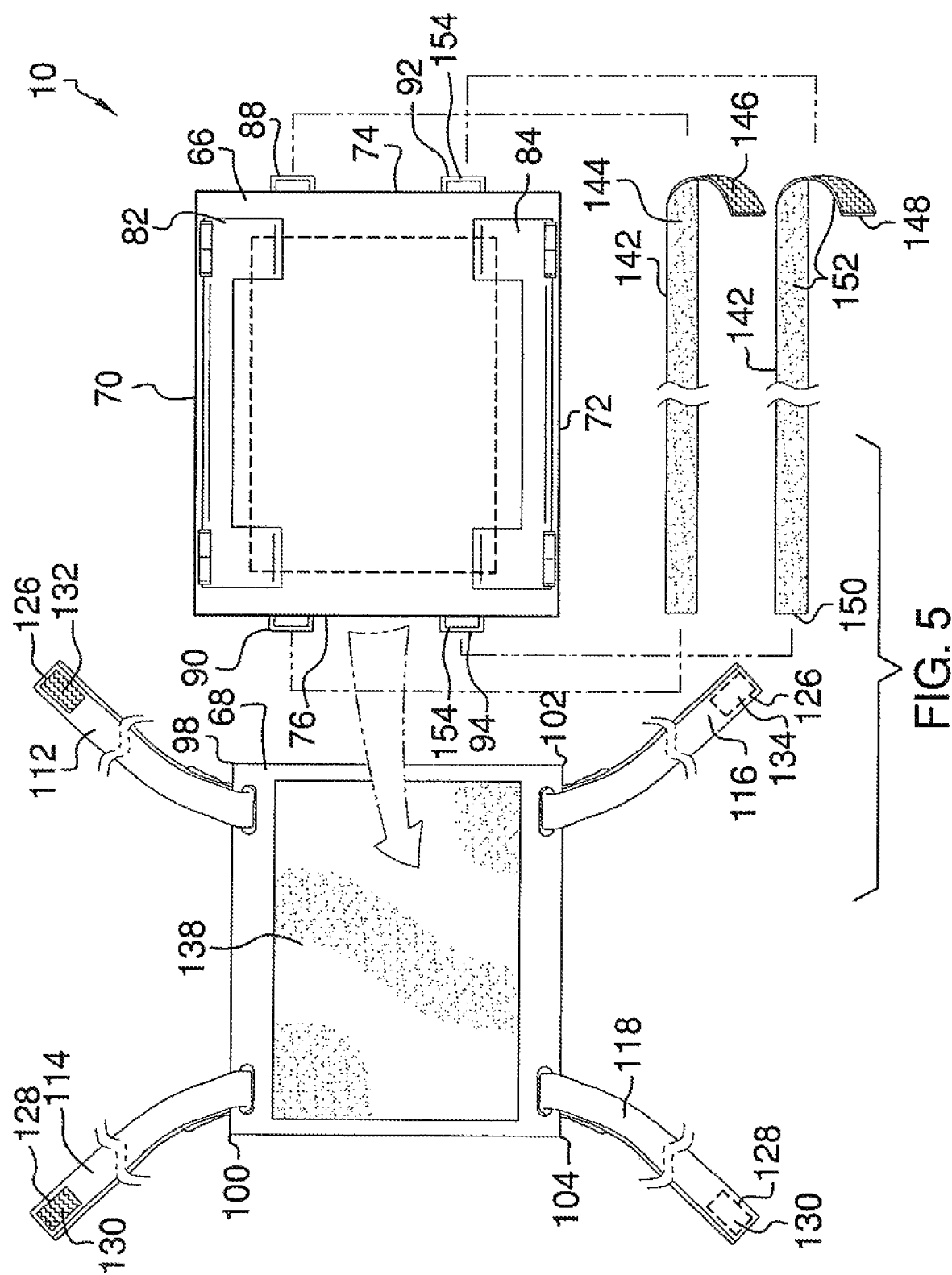
Figure 6:
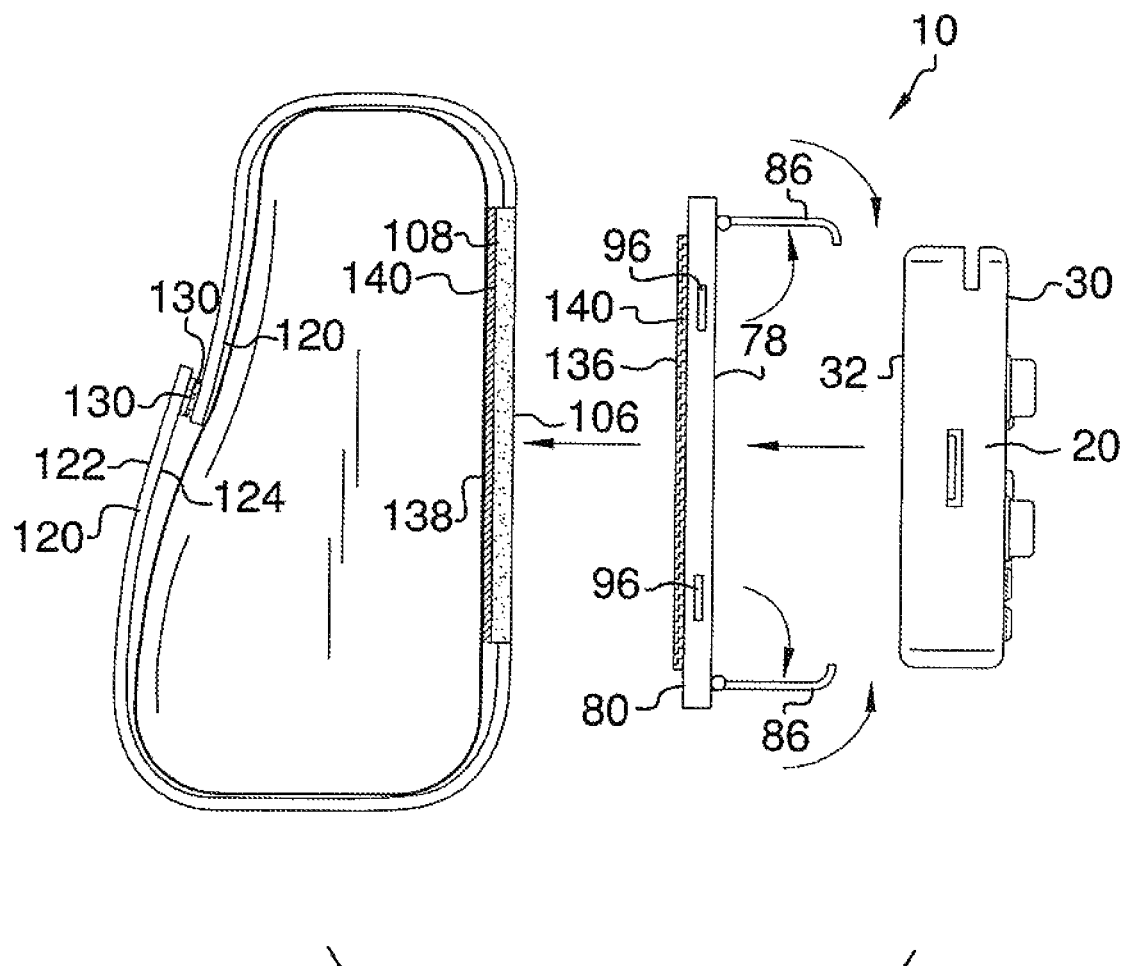
Figure 7:
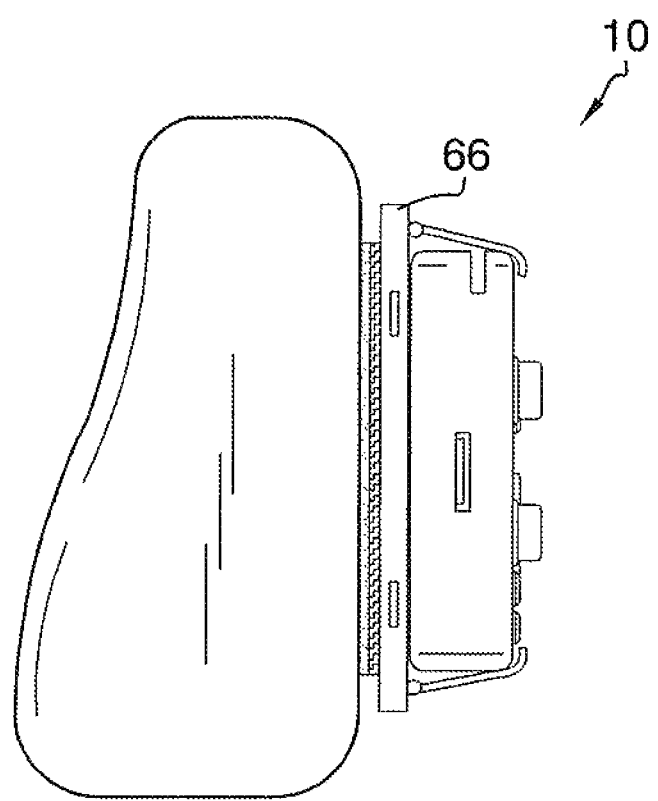

FIG. 1 is a front isometric view.
FIG. 2 is a rear elevation view.
FIG. 3 is a front elevation view.
FIG. 4 is a block diagram view.
FIG. 5 is a detail view showing an inner securing member and an outer securing member.
FIG. 6 is a side elevation view.
FIG. 7 is an in use view.

DETAILED DESCRIPTION OF THE DRAWINGS

With reference now to the drawings, and in particular FIGS. through 7 thereof, an example of the instant portable tracking device employing the principles and concepts of the present portable tracking device and generally designated by the reference number 10 will be described.

Referring to FIGS. 1 through 7 the present portable tracking device 10 is illustrated. The portable tracking device 10 includes a substantially rectangular base unit 20 having a top side 22, a bottom side 24, a convexly curved right side 26, a convexly curved left side 28, a front side 30, and a rear side 32. A display screen 34, a video camera 36, a keypad 38, a pair of lights 40, an activation control 42, a video control 44, and a camera control 46 are disposed on the front side 30 of the base unit 20. The pair of lights 40 includes a first light 48 and a second light 50. A color of the first light 48 is red, and a color of the second light 50 is green. A universal serial bus port 52 is disposed on the base unit 20. A bar code scanner 54 is disposed on a top side 22 of the base unit 20. A battery compartment 56 is disposed within the rear side 32 of the base unit 20, with a battery 58 removably disposed within the battery compartment 56. A central processing unit 60 is also disposed within the base unit 20.

The portable tracking device 10 further includes a plurality of tags 62, with each of the plurality of tags 62 having a barcode 64. The bar code scanner 54 is configured to scan the barcode 64 of each of the plurality of tags 62. The first light 48 of the pair of lights 40 is configured to activate when a user scans the barcode 64 of one of the plurality of tags 62 a first time. The first light 48 of the pair of lights 40 is configured to deactivate and the second light 50 of the pair of lights 40 is configured to simultaneously activate when the user scans the barcode 64 of one of the plurality of tags 62 a second time. Furthermore, the video control 44 is configured to activate a video portion of the video camera 36 and the camera control 46 is configured to activate a still camera portion of the video camera 36. The display screen 34, the video camera 36, the keypad 38, the pair of lights 40, the universal serial bus port 52, the bar code scanner 54, the battery 58, the central processing unit 60, the activation control 42, the video control 44, and the camera control 46 are in operational communication with each other.

The portable tracking device 10 optionally includes a rectangular removable inner securing member 66 and a rectangular outer securing member 68. The inner securing member 66 has a top surface 70, a bottom surface 72, a right side surface 74, a left side surface 76, a front surface 78, and a rear surface 80. Each of an upper clamp 82 and a lower clamp 84 of a pair of flexible clamps 86 is attached to the front surface 78 of the inner securing member 66 proximal the top surface 70 and the bottom surface 72, respectively. Each of an upper right hook 88, an upper left hook 90, a lower right hook 92, and a lower left hook 94 of a plurality of hooks 96 is attached to each of the right side surface 74 proximal the top surface 70, the left side surface 76 proximal the top surface 70, the right side surface 74 proximal the bottom surface 72, and the left side surface 76 proximal the bottom surface 72, respectively, of the inner securing member 66.

The outer securing member 68 has a right top corner 98, a left top corner 100, a right lower corner 102, a left lower corner 104, a front portion 106, a rear portion 108, and an adhesive covering 110 disposed on the rear portion 108. Each of an upper right outer strap 112, an upper left outer strap 114, a lower right outer strap 116, and a lower left outer strap 118 of a plurality of straps 120 has a front area 122 and a rear area 124. Each of the upper right outer strap 112, the upper left outer strap 114, the lower right outer strap 116, and the lower left outer strap 118 is attached to the outer securing member 68 proximal the right top corner 98, the left top corner 100, the right lower corner 102, and the left lower corner 104, respectively. Each of a right outer pair 126 and a left outer pair 128 of a plurality of a pair of interconnectable outer hook and loop fasteners 130 has an upper outer strip 132 and a lower outer strip 134. The upper outer strip 132 of each of the right outer pair 126 and the left outer pair 128 is disposed on the front area 122 of each of the upper right outer strap 112 and the upper left outer strap 114, respectively, and the lower outer strip 134 of each of the right outer pair 126 and the left outer pair 128 is disposed on the rear area 124 of each of the lower right outer strap 116 and the lower left outer strap 118, respectively. Each of the right outer pair 126 and the left outer pair 128 is configured to secure the upper right outer strap 112 to the lower right outer strap 116 and the upper left outer strap 114 to the lower left outer strap 118, respectively.

Each of a first square 136 and a second square 138 of a pair of interconnectable hook and loop fastener squares 140 is disposed on the rear surface 80 of the inner securing member 66 and the front portion 106 of the outer securing member 68, respectively. The pair of hook and loop fastener squares 140 is configured to removably secure the inner securing member 66 to the outer securing member 68. Each of a pair of inner straps 142 has an outer surface 144, an inner surface 146, a right end 148, a left end 150, and a fastening mechanism 152. One of the pair of inner straps 142 is removably disposable through a pair of the plurality of hooks 154. The fastening mechanism 152 is configured to secure the right end 148 of one of the pair of inner straps 142 to the left end 150 of one of the pair of inner straps 142 when one of the pair of inner straps 142 is disposed through the pair of the plurality of hooks 154. The pair of clamps 86 is configured to removably attach the base unit 20 to the inner securing member 68. Each of the base unit 20, the inner securing member 86, and the outer securing member 68 is optionally plastic.

What is claimed is:

1. A portable tracking device comprising:
   a substantially rectangular base unit having a top side, a bottom side, a convexly curved right side, a convexly curved left side, a front side, and a rear side;
   a display screen disposed on the front side of the base unit;
   a video camera disposed on the front side of the base unit;
   a keypad disposed on the front side of the base unit;
   a pair of lights disposed on the front side of the base unit, the pair of lights comprising a first light and a second light, wherein a color of the first light is red, and a color of the second light is green;
   a universal serial bus port disposed on the base unit;
   a bar code scanner disposed on a top side of the base unit;
   a battery compartment disposed within the rear side of the base unit;
   a battery removably disposed within the battery compartment;
   a central processing unit disposed within the base unit;
   an activation control disposed on the front side of the base unit;
   a video control disposed on the front side of the base unit;
   a camera control disposed on the front side of the base unit; and
   a plurality of tags, each of the plurality of tags having a barcode;
   wherein the bar code scanner is configured to scan the barcode of each of the 23 plurality of tags;
   wherein the first light of the pair of lights is configured to 1 activate when a user scans the barcode of one of the plurality of tags a first 2 time;
   wherein the first light of the pair of lights is configured to deactivate and the second light of the pair of lights is configured to simultaneously activate when the user scans the barcode of one of the plurality of tags a second time; wherein the video control is configured to activate a video portion of the video camera;
   wherein the camera control is configured to activate a still camera portion of the video camera;
   wherein the display screen, the video camera, the keypad, the pair of lights, the universal serial bus port, the bar code scanner, the battery, the central processing unit, the activation control, the video control, and the camera control are in operational communication with each other;
   a rectangular inner securing member having a top surface, a bottom surface, a right side surface, a left side surface, a front surface, and a rear surface;
   a pair of flexible clamps comprising an upper clamp and a lower clamp, each of the upper clamp and the lower clamp attached to the front surface of the inner securing member proximal the top surface and the bottom surface, respectively;
   a plurality of hooks comprising an upper right hook, an upper left hook, a lower right hook, and a lower left hook, wherein each of the upper right hook, the upper left hook, the lower right hook, and the lower left hook is attached to each of the right side surface proximal the top surface, the left side surface proximal the top surface, the right side surface proximal the bottom surface, and the left side surface proximal the bottom surface, respectively, of the 26 inner securing member;
   a rectangular outer securing member having a right top corner, a left top corner, a 2 right lower corner, a left lower corner, a front portion, a rear portion, and an adhesive covering disposed on the rear portion;
   a plurality of outer straps comprising an upper right outer strap, an upper left outer strap, a lower right outer strap, and a lower left outer strap, each of the upper right outer strap, the upper left outer strap, the lower right outer strap, and the lower left outer strap having a front area and a rear area,
   wherein the pair of hook and loop fastener squares is configured to removably secure the inner securing member to the outer securing member, and a pair of inner straps, having an outer surface, an inner surface, a right end, a left end, and a fastening mechanism;
   wherein one of the pair of inner straps is removably disposable through a pair of the plurality of hooks,
   wherein the fastening mechanism is configured to secure the right end of one of the pair of inner straps to the left end of one of the pair of inner straps when one of the pair of inner straps is disposed through the pair of the plurality of hooks;
   wherein the pair of clamps is configured to removably attach the base unit to the inner securing member;
   wherein each of the upper right outer strap, the upper left outer strap, the lower right outer strap, and the lower left outer strap is attached to the outer securing member proximal the right top corner, the left top corner, the right lower corner, and the left lower corner, respectively;
   a plurality of a pair of interconnectable outer hook and loop fasteners comprising a right outer pair and a left outer pair, each of the right outer pair and the left outer pair having an upper outer strip and a lower outer strip, wherein the upper outer strip of each of the right outer pair and the left outer pair is disposed on the front area of each of the upper right outer strap and the upper left outer strap, respectively, and the lower outer strip of each of the 28 right outer pair of hook and loop fasteners and the left outer pair of hook 1 and loop fasteners is disposed on the rear area of each of the lower right 2 outer strap and the lower left outer strap, respectively;
   wherein each of the right outer pair of hook and loop fasteners and the left outer pair of hook and loop fasteners is configured to secure the upper right outer strap to the lower right outer strap and the upper left outer strap to the lower left outer strap, respectively;
   a pair of interconnectable hook and loop fastener squares comprising a first square and a second square, wherein the first square is disposed on the rear surface of the inner securing member, and the second square is disposed on the front portion of the outer securing member, wherein the pair of hook and loop fastener squares is configured to removably secure the inner securing member to the outer securing member; and
   a pair of inner straps, each of the pair of inner straps having an outer surface, an inner surface, a right end, a left end, and a fastening mechanism, wherein one of the pair of inner straps is removably disposable through a pair of the plurality of hooks, wherein the fastening mechanism is configured to secure the right end of one of the pair of inner straps to the left end of one of the pair of inner straps when one of the pair of inner straps is disposed through the pair of the plurality of hooks;

wherein the pair of clamps is configured to removably attach the base unit to the inner securing member.

2. The portable tracking device of claim 1 wherein each of the base unit, the inner securing member, and the outer securing member is plastic.

\* \* \* \* \*